US012762538B2

(12) United States Patent
Seidemann

(10) Patent No.: US 12,762,538 B2
(45) Date of Patent: Oct. 13, 2026

(54) SECURE SERVICE PROVIDER, SECURE WALLET, METHOD FOR ISSUING ONE OR MORE SECURE WALLETS

(71) Applicant: Giesecke+Devrient advance52 GmbH, Munich (DE)

(72) Inventor: Wolfram Seidemann, Munich (DE)

(73) Assignee: GIESECKE+DEVRIENT ADVANCE52 GMBH, Munich (DE)

( * ) Notice: Subject to any disclaimer, the term of this patent is extended or adjusted under 35 U.S.C. 154(b) by 0 days.

(21) Appl. No.: 18/588,962

(22) Filed: Feb. 27, 2024

(65) Prior Publication Data

US 2024/0296441 A1 Sep. 5, 2024

(30) Foreign Application Priority Data

Mar. 1, 2023 (EP) .................................... 23020100

(51) Int. Cl.
*G06Q 20/36* (2012.01)
*G06Q 20/06* (2012.01)
*G06Q 20/38* (2012.01)

(52) U.S. Cl.
CPC ....... *G06Q 20/363* (2013.01); *G06Q 20/0655* (2013.01); *G06Q 20/3674* (2013.01); *G06Q 20/38215* (2013.01); *G06Q 20/3829* (2013.01)

(58) Field of Classification Search
CPC ............................................ G06Q 20/36–3678
See application file for complete search history.

(56) References Cited

U.S. PATENT DOCUMENTS

| | | | | |
|---|---|---|---|---|
| 10,929,841 | B1 * | 2/2021 | Kalaboukis .......... | G06Q 20/363 |
| 2012/0296741 | A1 * | 11/2012 | Dykes .................. | G06Q 20/322 705/16 |
| 2014/0172533 | A1 * | 6/2014 | Andrews ............ | G06Q 30/0229 705/14.27 |
| 2015/0324789 | A1 * | 11/2015 | Dvorak ................. | H04L 9/3297 705/67 |

(Continued)

FOREIGN PATENT DOCUMENTS

| | | | |
|---|---|---|---|
| DE | 102021004020 | A1 | 2/2023 |
| DE | 102021004548 | A1 | 3/2023 |

(Continued)

OTHER PUBLICATIONS

European Search Report from corresponding EP Application No. 23020100.6, Jun. 30, 2023.
Anonymous: "BIP 0032—Bitcoin Wiki", Sep. 24, 2019, pp. 1-7.

*Primary Examiner* — Jay Huang
(74) *Attorney, Agent, or Firm* — Workman Nydegger

(57) ABSTRACT

A secure service provider unit (SPU) in an electronic transaction system includes: a secure wallet issuing unit (TMU-IU) including control means configured to issue secure wallets (TMU-U) for users (U) in the electronic transaction system (TS). Each secure wallet (TMU-Ux) has wallet identification data (TMU-ID) assigned to a secure wallet (TMU-Ux) for uniquely identifying the secure wallet (TMU-Ux) in the electronic transaction system (TS). The control means of the secure wallet issuing unit (TMU-IU) for a secure wallet to be issued is configured to provide at least a part (TMU-ID-VAR) of the wallet identification data (TMU-ID), which is derived from external digital identification data (D-ID-Ux).

13 Claims, 7 Drawing Sheets

(56) References Cited

U.S. PATENT DOCUMENTS

| | | | | |
|---|---|---|---|---|
| 2016/0180333 | A1* | 6/2016 | Leyva | G06Q 20/42 705/41 |
| 2016/0292672 | A1* | 10/2016 | Fay | G06Q 20/36 |
| 2017/0337556 | A1* | 11/2017 | Kohli | G06Q 20/36 |
| 2018/0374091 | A1* | 12/2018 | Madisetti | G06Q 20/3825 |
| 2020/0202331 | A1* | 6/2020 | Vudathu | H04L 9/0866 |
| 2021/0166223 | A1* | 6/2021 | Moiyallah, Jr. | G06Q 20/389 |
| 2022/0207500 | A1 | 6/2022 | Gawlas et al. | |
| 2022/0215355 | A1 | 7/2022 | Gawlas et al. | |
| 2022/0284428 | A1 | 9/2022 | Zhou et al. | |
| 2023/0055618 | A1 | 2/2023 | Jakobsson et al. | |
| 2023/0093581 | A1 | 3/2023 | Fritzhanns et al. | |
| 2023/0103038 | A1 | 3/2023 | Fritzhanns et al. | |
| 2023/0259901 | A1 | 8/2023 | Herborg | |
| 2024/0320654 | A1* | 9/2024 | Samuelsson | G06Q 20/3223 |

FOREIGN PATENT DOCUMENTS

| | | | |
|---|---|---|---|
| WO | 2020212331 | A1 | 10/2020 |
| WO | 2020212337 | A1 | 10/2020 |
| WO | 2021170645 | A1 | 9/2021 |
| WO | 2021170646 | A1 | 9/2021 |
| WO | 2022008319 | A1 | 1/2022 |
| WO | 2022048826 | A1 | 3/2022 |

* cited by examiner

Fig. 1 – Prior Art

SECURE SERVICE PROVIDER, SECURE WALLET, METHOD FOR ISSUING ONE OR MORE SECURE WALLETS

BACKGROUND

The invention relates to a secure service provider unit in an electronic transaction system in particular an electronic payment transaction system. The invention also relates to a secure wallet. The invention also relates to an electronic transaction system in particular an electronic payment transaction system. The invention further relates to a method for issuing one or more secure wallets, issued by a secure service provider unit of an electronic transaction system.

Tokens—also referred to as digital assets, electronic coins, coin data sets—may represent any digital asset, in particular a digital currency, preferably a central bank digital currency, short CBDC. These tokens are issued and deleted by a unit of the transaction system, such as an issuing authority, a central bank unit or a commercial bank unit, hereinafter also referred to as secure token issuing unit.

Electronic token transactions and/or storage of tokens and any associated transaction data and/or storage data must be safe and secure and so, means for protecting confidentiality, integrity, and availability of exchanged and/or stored token data must be implemented. This is in particular true for electronic payment transactions and associated payment transactions and payment storages in which a monetary value is linked with each token.

There are different technical approaches for a digital asset e.g. digital currency such as CBDC, issued by a central bank.

According to a first approach, tokens are merely cryptographically secured by the central bank unit and the cryptographically secured tokens are exchanged directly between token management units—also referred to as wallets—of the participants in an encrypted manner. The exchanged token may also be stored in an encrypted manner. The token management units can verify the authenticity of the tokens based on the cryptographic security, such as keys and signatures, and for example checks a certificate from the central bank and/or the other token management units for validity within the certificate hierarchy in advance via online access or following the offline-protocol of the system.

According to a second approach, tokens are stored in a centralized or decentralized blockchain/distributed ledger of the transaction system, e.g., organized by a central bank unit. For a transaction, an ownership of a token record changes in the blockchain for which a lot of information (sender/recipient/amount) is required and/or even published. Sender and recipient of the token need an online access to the blockchain at the time of the transaction.

According to a favorable third approach as for instance described in WO 2020/212 331 A1 tokens are stored in a local token management unit (also called wallet or payment application unit or secure element) to be directly exchanged between participants of an electronic payment transaction system. The transferred token can validly be used after receipt from another participant without a need of approval or verification via an online connection. So, if an online connection is not available or inconvenient or should not be used for a specific token transaction, it remains possible to validly transfer tokens directly between participants in the electronic payment transaction system. For security-, verification- and registration-purposes, a token register stores token references of all valid tokens without knowing the tokens itself. So, the user can check validity of a received token. The token register only stores token references of the corresponding token. Tokens can be further modified by each individual participant, e.g., ownership of tokens can be switched from one participant to another participant (SWITCH modification), tokens can be split into plural tokens, e.g., for obtaining a token with a reduced monetary value (SPLIT modification) and/or plural tokens can be merged to a single token, e.g., for obtaining a token with a higher monetary value (MERGE modification).

For managing the tokens, such as performing the transactions and storing the tokens, secure token management units, also known as wallets, are used. For the second approach these wallets can be referred to as account wallets. For the third approach, these wallets are typically referred to as token-wallets.

A wallet can be provided as a hardware wallet, e.g. as a smart card issued to a participant, or can be a so-called hosted-wallet, e.g. a wallet that is hosted by the individual service provider.

For security it is necessary to provide an onboarding process that allows to relate to real participants in the electronic payment system. However at the same time it is required to assure a high degree of anonymity and/or privacy.

It is known that financial service providers follow a known "know-your-customer" KYC-concept to assign a verified identity of each customer with an internal customer name or an internal customer ID by using internal databases. The financial service provider issues hosted wallets or hardware wallets that are assigned only with these internal customer names/IDs. In this KYC-concept, a fraud can only be identified if transaction data are evaluated. For that, the transaction data need to include the internal customer names/IDs. In case of a suspicious transaction, an official authority needs to request access to the internal database to resolve which "real" person is assigned to an internal customer name/ID. Each financial service provider in an electronic payment system following the CBDC approach must run such a KYC concept to resolve such fraud attempts. This is considered highly inefficient.

It is further known from WO 2022/048 826 A1 that a known ID is encrypted for a central bank instance and this encrypted ID is transferred in an additional data field in each transaction. This highly increases the required data needed to perform the transaction and is thus considered inefficient, too.

So, there is a need for more efficiently identifying real participants in an electronic payment transaction system if secure token management units, such as hardware wallets or hosted wallets, are used. So, additional data fields in each transaction data or decentralized plural KYC-concepts should be avoided. Furthermore, KYC requirements need to be fulfilled in an efficient way even if the to be onboarded real person is not previously known to a secure token management unit (=wallet) issuing unit, e.g. efficient onboarding of unbanked people.

SUMMARY

In an aspect of the present invention there is provided a secure service provider unit in an electronic transaction system, in particular an electronic payment transaction system, the secure service provider unit comprising a secure wallet issuing unit comprising control means configured to issue one or more secure wallets for users in the electronic transaction system. Each secure wallet comprises wallet identification data. The wallet identification is provided by the secure wallet issuing unit. The wallet identification data is assigned to a secure wallet for uniquely identifying the secure wallet in the electronic transaction system. The control means of the secure wallet issuing unit is further configured to derive at least a part of the wallet identification data based on at least external digital identification data.

A secure wallet may be a secure token-wallet that is also referred to as secure token management unit to preferably follow the above-mentioned third approach of transaction systems. Such a secure token-wallet is used to locally manage the token, e.g. in a secure element itself or in a wallet hosting server such as the secure service provider unit. The secure token-wallet may modify the tokens (e.g. split, merge or switch tokens-see above) and to register the token in the electronic transaction system. The token may be stored in a token storage that is also managed by the token-wallet.

Alternatively, or additionally, a secure wallet may be a secure account-wallet that is also referred to as secure account management unit in particular to follow the above-mentioned second approach of transaction systems. Such a secure account-wallet is used to not manage tokens in a secure element itself but in a decentralized ledger, such as a blockchain or a centralized ledger, such as a database that stores the token centrally in the electronic transaction system. Managing, modifying, and/or registering of the tokens in the electronic transaction system is initiated by the secure account-wallet, however, token transaction or token storage is performed remote of the secure element or the service provider unit.

Accordingly, the secure wallet issuing unit may be configured to provide at least the derived part of the wallet identification data or the derived wallet identification data. In particular, the wallet identification data may comprise data fields, wherein one of the data fields is used for inserting the derived part of the wallet identification data.

It could be added that, after issuance, the wallet identification data will be stored in the issued secure wallet and/or used in transactions with other wallets of the transaction system.

The external digital identification data is assigned to a respective user to whom the secure wallet is to be issued in the electronic transaction system. This user can be a natural person, a legal person or an organization. The external digital identification data may be assigned to the user in an external, preferably national or government, digital identity system for uniquely identifying the user. The term "external" in this context means external to the transaction system. Hence, transaction system internal data, such as e.g. a transaction account number or a customer number, are no external data. Finally, for secure wallets of devices/machines preferably the user also is a natural person, a legal person or an organization, but could be the device/machine (at least in future digital identity systems).

The respective user to whom the secure wallet is to be assigned may hereinafter be referred to as "real" participant.

The wallet identification data includes the external digital identification data—and optionally a type-value and/or a count-value (see below)—in a form hidden by the derivation. In addition or alternatively the external digital identification data—and optionally the type-value and/or the count-value—can only be inverse-derived from the wallet identification data based on secret inverse-derivation data. In other words, at least the part of the wallet identification data is derived such that inverse-derivation requires secret inverse derivation data. The secret inverse derivation data typically is cryptographic secret data, such as a key (e.g. of a symmetric or asymmetric cryptographic scheme). The secret inverse derivation data may be static or individual for each secure service provider unit, user or derivation session (e.g. by adding respective individual data to a base secret). Only the owner of secret inverse derivation data, typically a single central unit of the transaction system, would be able to inverse-derive the external digital identification data from the wallet identification data.

For security reasons and for not jeopardizing the privacy and/or anonymity in the electronic payment system, the reversal (resolving) of the "real" participant should not be generally possible (for the public/participants if the transaction system). In particular it would take place, if a legal title obliges the cooperation of the involved organizations in order to infer back to the person. The wallet identification data is part of the transaction data exchanged in the transaction system and/or the transaction protocol data protocolled in the transaction system. The transactions and/or the transaction protocol data are user-anonymous, but allow the inverse derivation unit of the transaction system, such as a fraud management unit or a system management unit, to find out the user (real participant).

A service provider unit may be a financial service provider unit, such as a commercial bank or Fintech company. Alternatively, or additionally, a service provider unit may be an official authority. Alternatively, or additionally, a service provider unit may be a mobile communication service provider. Alternatively, or additionally, a service provider unit may be any other regulated or non-regulated party that participates in the electronic transaction system, e.g. a payment transaction system that involves CBDC, as authorized by the token issuing authority.

The external digital identification data may be assigned to the user in an external digital identity system for uniquely identifying the user. The external digital identity system preferably is a national/government/official authority digital identity system. The external digital identification data may be at least one of the following: a tax number for identifying the user in a tax office; an identity card number for identifying an identity card of the user; a passport number for identifying a passport of the user; a driver's license number for identifying a driver's license of the user; an international mobile subscriber identity for identifying the user in a mobile network. Other uniquely assigned identification data of external digital identity systems could be selected.

The digital identification data preferably is a national or international digital identity that a citizen may be assigned to in a registration process at an official authority, such as a residents' registration office or a tax office or a vehicle registration authority, and so on. So, the digital identification data can be a national or international electronic identification number of a real person issued by an authority and not just a number that is assigned or linked with a user ID.

With the digital identification data, a transaction and/or storing within the transaction system can now—under certain preconditions—be directed to the "real" participant without increasing the overall transaction data amount and without compromising the privacy level of the transaction system to the user.

Providing the wallet identification data may comprise the derivation (generating) of the wallet identification data at the wallet issuing unit. In this case, the provisioning may be the coding of the identification data by control means of the wallet issuing unit. In such a case, the service provider unit (or its respective secure token management unit issuing unit control means) codes the wallet identification data. This coding is performed to assign the wallet identification data with the secure wallet that is to be issued. Each token transaction made by this wallet and/or each token being managed, such as stored, by this wallet can be locally or centrally protocolled. In case of a suspicious transaction or fraudulent pattern is identified, the protocols may be reviewed.

Alternatively, providing the wallet identification data may comprise the receipt of the wallet identification data from a derivation unit, preferably a central derivation unit, such as one or more of an official authority; a secure token issuing unit, e.g. a central bank unit; and/or an electronic identity system.

So, the service provider unit may issue secure elements, such as smartcards or other hardware token that may comprise identification data for identifying the user. These identification data may be known to a secure element manufacturer during a request for personalization. This secure element manufacturer may receive these identification data as personal data during a personalization procedure and may provide these identification data to the service provider unit, especially the wallet issuing unit.

In a preferred embodiment, the wallet identification data is a mandatory data to be transmitted between individual participants in the electronic transaction system, preferably for direct exchange of tokens, in particular digital currency tokens. This may be a system requirement to ensure high standard security. The wallet identification data is not only used to uniquely identify the electronic participant, but it is now selectively also possible to identify the "real" participant by resolving the identification data. Only one data for identifying both "real" and electronic participant is required which may reduce the overall data transfer rates for token transactions.

In a further embodiment, the wallet identification data comprises a plurality of data fields. One of the plurality of data fields is used for inserting the derived part of the wallet identification data.

One or more other data fields of the plurality of data fields may include a version value that expresses the current version of the wallet identification data format that is used.

One or more other data fields of the plurality of data fields may include a central token issuing unit identifier that expresses the central token issuing unit of the electronic transaction system. With such a data field it is possible to enable multi-currency token transactions. A first identifier may be used to identify a first central token issuing unit (=central bank herein) that issues token of a first currency, whereas a second identifier may be used to identify a second central token issuing unit that issues token of a second currency.

One or more other data fields of the plurality of data fields may include an identifier of the service provider unit and/or a smart card producer and/or card manufacturer and/or card issuer to identify the service provider unit and/or the smart card producer and/or card manufacturer and/or card issuer or other stakeholder in the transaction system.

Preferably, the wallet identification data further comprises a data element for a type-value configured to identify the type of the digital identification data, preferably the digital identity system of the digital identification data.

Preferably, the wallet identification data further comprises a data element for a count-value configured to identify a number secure wallets of issued. The count value may represent the number of secure wallets issued for the external digital identification data and/or for the user. In particular, the number may represent the number of secure wallets issued for the external digital identification data and/or the user in the transaction system (or in a less preferred option, in the secure service provider unit). The count value may also represent the number of secure wallets issued (for any users) in the secure service provider unit.

The derived part of the wallet identification data may comprise the type-value and/or the count-value. So, type value and/or count value can be provided in the wallet identification data either in clear text or in a hidden form/as a derived part.

Preferably, the wallet identification data is inserted into a subject name data field of a cryptographical certificate used within a transaction or storage of tokens within the electronic transaction system. Since, certificates may be used to clearly identify the participant in a token transaction/storage, no additional data set is required to derive the "real" participant in case of suspicious transaction and or suspiciously stored token.

Each combination as named herein may be referred to as a concatenation, which is a logical combination used in information technology.

More preferably, the certificate further comprises a serial number data field for inserting a serial number, wherein the serial number is unique in the electronic transaction system. Thus at least the combination of the subject name and serial number is also unique for the certificate in the electronic transaction system.

The secure service provider unit further comprises a secure wallet comprising control means for managing one or more token of the electronic transaction system using the wallet identification data to protocol a direct exchange of one or more token with one or more other secure wallets in the electronic transaction system, wherein the control means is configured to cause the direct exchange of the one or more token with the one or more other wallets in the electronic transaction system, and to send registration requests including token references to a token register of the electronic transaction system.

The secure service provider unit may comprise a token storage accessible by the control means of the secure service provider unit, preferably the control means of the secure wallet.

The secure service provider unit may be further configured to manage one or more secure wallets of users of the electronic transaction system, wherein preferably, the secure service provider unit comprises the one or more secure wallets (hosted wallets).

The secure service provider unit may optionally comprise a token storage as a physical entity. The secure wallet of the secure service provider unit may be configured to access the token storage. The token storage may be a token vault of this secure service provider unit. Each secure service provider unit in the transaction system may comprise its own token storage.

From the secure wallet the token can be transferred to any other secure wallet, e.g., owned by a customer of the service provider unit.

The secure service provider unit may further be configured to manage one or more secure wallets of users (e.g., customers of the service provider unit, such as service receiving units or participants in the payment system) of the electronic transaction system. Preferably, the secure service provider unit comprises (hosts) the one or more secure wallets as entities in the secure service provider unit, which hereinafter is referred to as hosted wallets.

As addressed before, the wallets may be token-wallets or account-wallets.

The secure wallet issuing unit may be further configured to generate one or more secure sub-wallets from the issued secure wallet for that user in the electronic transaction system. The wallet identification data of the one or more generated secure sub-wallets may be generated from the wallet identification data of the issued secure wallet for that user for uniquely identifying the one or more secure sub-wallet in the electronic transaction system. Preferably the generation for the sub-wallet comprises adding a sub-wallet indicator and/or increasing or adding a count value in the wallet identification data of the issued secure wallet.

So, one can now register a secure root wallet with the identification data of the user. Subsequently, secure sub-wallets can be generated by the secure wallet issuing unit based on the already known identification data of the user which relate to the secure root wallet. So, complex onboarding processes for further secure wallets of that person in that secure service provider unit can be avoided, once a secure root wallet is issued. In such scenarios, secure sub-wallets can be passed on to kids or as a present. These sub-wallets are still traceable back to the issuing authority (central bank, etc.) and the "real" person deriving the wallets.

According to another aspect, an electronic transaction system, in particular an electronic payment transaction system, comprises a plurality of secure wallets of users-preferably as described above or below; and one or more service provider units as described above. The system preferably further comprises a secure token issuing unit and/or a token register. The toke issuing unit comprises a minting unit configured to generate a new token to be issued in the electronic transaction system and a melting unit configured to delete tokens to be deleted from the electronic transaction system. The token register for registering the tokens, preferably token references of the tokens, of the electronic payment transaction system.

The secure wallet may be a hardware security module built in hardware or software to enable tamperproof and secure access to the tokens.

Preferably, the secure token issuing unit may comprise a dedicated identification data server. This dedicated identification data server may be used to derive identification data used for the secure wallets and/or the derived secure sub-wallets.

In an embodiment, the dedicated identification data server is configured to determine whether the user comprises (is assigned to) more than one secure wallet identification data. In an electronic transaction system requirement, it may be that a user is not allowed to own more than one secure wallet identification data. In case, it is determined, that the user is assigned to more than one secure wallet identification data, the dedicated identification data server generates a warning to the system so that the secure wallets that are assigned to the users may be blocked.

According to an aspect of the invention a secure wallet in an electronic transaction system is provided. The secure wallet comprising wallet identification data being assigned to the secure wallet for uniquely identifying the wallet in the electronic transaction system. At least a part of the wallet identification data is derived based on external digital identification data.

The secure wallet may be a token-wallet or an account-wallet as describe above.

The secure wallet may be implemented in a secure element, e.g. as a hardware-wallet. Alternatively, the secure wallet may be implemented as a hosted-wallet.

The secure wallet may have wallet identification data according to the above-described manner.

In another aspect there is provided a method for issuing one or more secure wallets for users in an electronic transaction system, preferably an electronic transaction system as described above, the one or more secure wallets being issued by a secure service provider unit of the electronic transaction system. The method comprising the steps of:

Receiving external digital identification data of a user by control means of a secure service provider unit;

Providing wallet identification data including at least a part of the wallet identification data being derived based on at least the digital identification data, particularly provided as described above;

Assigning the wallet identification data to a wallet for the user to whom the secure wallet is to be issued in the electronic transaction system; and Issuing the secure wallet to the user in the electronic transaction system.

The method preferably further comprises, prior to the receiving step:

receiving digital identification data of the user by a control means of the secure service provider unit; and/or requesting, by a user equipment, a secure wallet at the secure service provider unit.

A protocolling of transactions may be caused by the secure wallet by inserting the wallet identification data in the transaction, preferably a direct exchange of the one or more tokens; and/or by adding the wallet identification to protocol data (locally or centrally stored for each transaction).

In a further aspect, a non-transitory computer readable storage medium for tangibly storing computer program instructions capable of being executed by a processor is described. The computer program instructions defining the steps the method as described above.

Each token comprises a monetary value as a first token element. The monetary value may be a data that represents money usable in one or more electronic payment transaction.

Each token may further comprise a private value as a second token element. The private value may be a random number or may be a secret that is not known to participants not involved in a transaction. The private value may be a private element of a token element pair. A corresponding public element of such a token element pair may be used as an element in a token reference that is stored in a token register to register first-type tokens and second-type tokens.

In addition, each token may have further token elements as outlined below and may also have further token elements such as further metadata, e.g., currency data that indicates the currency which the monetary amount represents and/or validity data and/or timestamp data.

The token may also be referred to as a value note within this disclosure. The token can be used in online and offline payment transactions. The token may represent central bank digital currency, CBDC.

The token may comprise one or more token-individual history entries as a further token element. One history entry may represent one modification, such as SWITCH, SPLIT, MERGE, performed with this token. Such a further token element may also be referred to as history data.

It is possible to exchange a token in offline electronic payment transactions between two locally communicating wallets/secure token managing units (e.g. wallets, preferably secure elements having established a secured communication channels) within the electronic payment transaction system.

An online electronic payment transaction payment is defined herein as a transaction in which a secure wallet (e.g. in a secure element) that participates in the transaction, e.g.

the secure wallet that initiates the token transfer (payer) or the secure wallet that receives a token (payee), has access and can communicate with one or more remote instances of the electronic payment system, such as a token register, a transaction register, a token issuing unit, a service provider unit such as financial service provider (FSP) via classical internet or mobile communication means or any other suitable online communication protocol. So, immediately before, while or after performing the transaction, also a registration of the transaction by storing a respective token reference in a remote token register may be performed by one of the secure wallets involved in the transaction.

An offline electronic payment transaction payment is defined herein as a direct transaction between two secure wallets (e.g. residing in secure elements) that participate in the transaction, e.g. the secure wallet that initiates the token transfer (payer) and/or the secure wallet that receives a token (payee). At least one of payer or payee has no access and cannot communicate with remote instances of the transaction system, such as a token register, a transaction register, a token issuing unit and/or a service provider unit, such as financial service provider (FSP) via classical internet or mobile communication means. The token transfer may then take place by local wireless communication means, such as Bluetooth, NFC, or any other suitable wireless communication protocol. The token transfer may also take place by contact-based communication means, such as USB, ISO 7816, or any other suitable contact-based communication protocol.

For a registration of a token in the token register, a token reference of the token may be generated. Each token reference comprises a public value as well as a monetary value as two distinct token reference elements.

The public value as a token reference element may be a public key of an asymmetric cryptographic key pair, wherein the private value of the token is the private key of the asymmetric cryptographic key pair. In this embodiment, the private value and the public value are considered as a token element pair.

The token reference may also comprise a monetary value as a distinct token reference element. This monetary value may be the monetary value of the first-type token from which the one or more second-type token is originated from. In case, just one second-type token is generated in the generating step, the monetary value of the second-type token may be used as monetary value for the token reference, because both monetary values are equal.

The token reference may be sent to and stored in the token register. So, a token becomes registered as a valid token in the transaction system and can be used for further online or offline electronic payment transactions.

A token "managed by" a token management unit, such as the above described secure wallets, is a token that resides in a memory (storage) space. The memory space can be an internal memory space of the token management unit, or it can be an external memory space to which the token management unit has exclusive access rights. This memory space can include a remote memory space, such as a cloud memory (storage) space.

Implementation of modifications to tokens can be performed with the known payment transactions of WO 2020/212 337 A1; WO 2020/212 331 A1; WO 2021/170 646 A1 and WO 2021/170 645 A1 protocols.

A technical implementation of the methods at the service provider unit(s) can be performed using computer applets, such as agents, for instance running on secure hardware modules. A technical implementation of the described method steps can be the inclusion into secure element as software agent.

A corresponding token reference is associated with each token in the method and payment transaction system. Knowledge of a token reference does not authorize issuing of the digital money represented by the token. This represents a key difference between token references and tokens. A token reference is unique and also uniquely associated with one token, so there is a 1-to-1 relationship between the token and the token reference. The token reference can be computed by each participant, such as a secure wallet (e.g. in a secure element) of a participant in the electronic payment system. The computing is preferably performed by the control means.

The token reference may be obtained by applying a one-way function, for example a homomorphic one-way function or a cryptographic function. This function is a one-way function, i.e., a mathematical function that is "easy" to compute in terms of complexity theory, but "difficult" to practically impossible to reverse. Here under one-way function also a function is designated, to which up to now no inversion practically executable in appropriate time and with justifiable expenditure is known. Thus, the calculation of a token reference from a token is comparable to or equivalent to the generation of a public key in an encryption method via a residue class group. Preferably, a one-way function is used that operates on a group in which the discrete logarithm problem is difficult to solve, such as a cryptographical method analogous to an elliptic curve encryption, or ECC, from a private key of a corresponding cryptographic method. The reverse function, i.e., the generation of the token from the token reference, is thereby-equivalent to the generation of the private key from a public key in an encryption method over a residue class group-very time-consuming.

In one embodiment, the one-way function is homomorphic, i.e., a cryptographical method that has homomorphism properties. Thus, mathematical operations can be performed on the token reference that can also be performed in parallel on the token and thus be traced. Using the homomorphic one-way function, calculations with token references can be traced in the monitoring entity without the corresponding tokens being known there.

In a preferred embodiment, the one-way function is a cryptographical encryption function, e.g., based on an asymmetric or symmetric encryption scheme.

When transmitting a token directly between secure wallets, both have knowledge of the token. Preventing a double spending (one secure wallet sends the token to two different secure wallets), a switch operation on the token may be executed. The switch can preferably occur automatically when a token is received. In addition, it may also occur upon request, for example, a command from a secure wallet.

Switching, splitting, and merging are different modifications to the token. These modifications require registering the token reference in the payment system in case the validity should be proven.

In addition, it is advantageous that the tokens can be transmitted in any format. This implies that they can be communicated, i.e. transmitted, on arbitrary channels. They do not have to be stored in a determined format or in a determined program.

A mobile terminal or another user equipment, for example a smartphone, may be used as a terminal to power-up a token management unit. The secure wallet may be a physically attachable/detachable element. Alternatively, or additionally, the terminal can also be an apparatus, such as a wearable, machine, tool, vending machine or even container or vehicle.

A terminal or another user equipment according to the invention is thus either stationary or mobile. The terminal is preferably adapted to use the internet and/or other public or private networks. For this purpose, the terminal uses a suitable connection technology, for example Bluetooth, LoRa, NFC and/or Wi-Fi, and has at least one corresponding interface. The terminal may also be adapted to be connected to the internet and/or other networks by means of access to a mobile network.

In the following, the invention or further embodiments and advantages of the invention are explained in more detail based on drawings, wherein the drawings describe only embodiments of the invention. Identical components in the drawings are given the same reference signs. Elements drawn with dashed lines are considered as optional elements.

BRIEF DESCRIPTION OF THE DRAWINGS

The drawings are not to be regarded as true to scale, and individual elements of the drawings may be shown in exaggeratedly large or exaggeratedly simplified form.

DETAILED DESCRIPTION OF THE INVENTION

Figure 1:
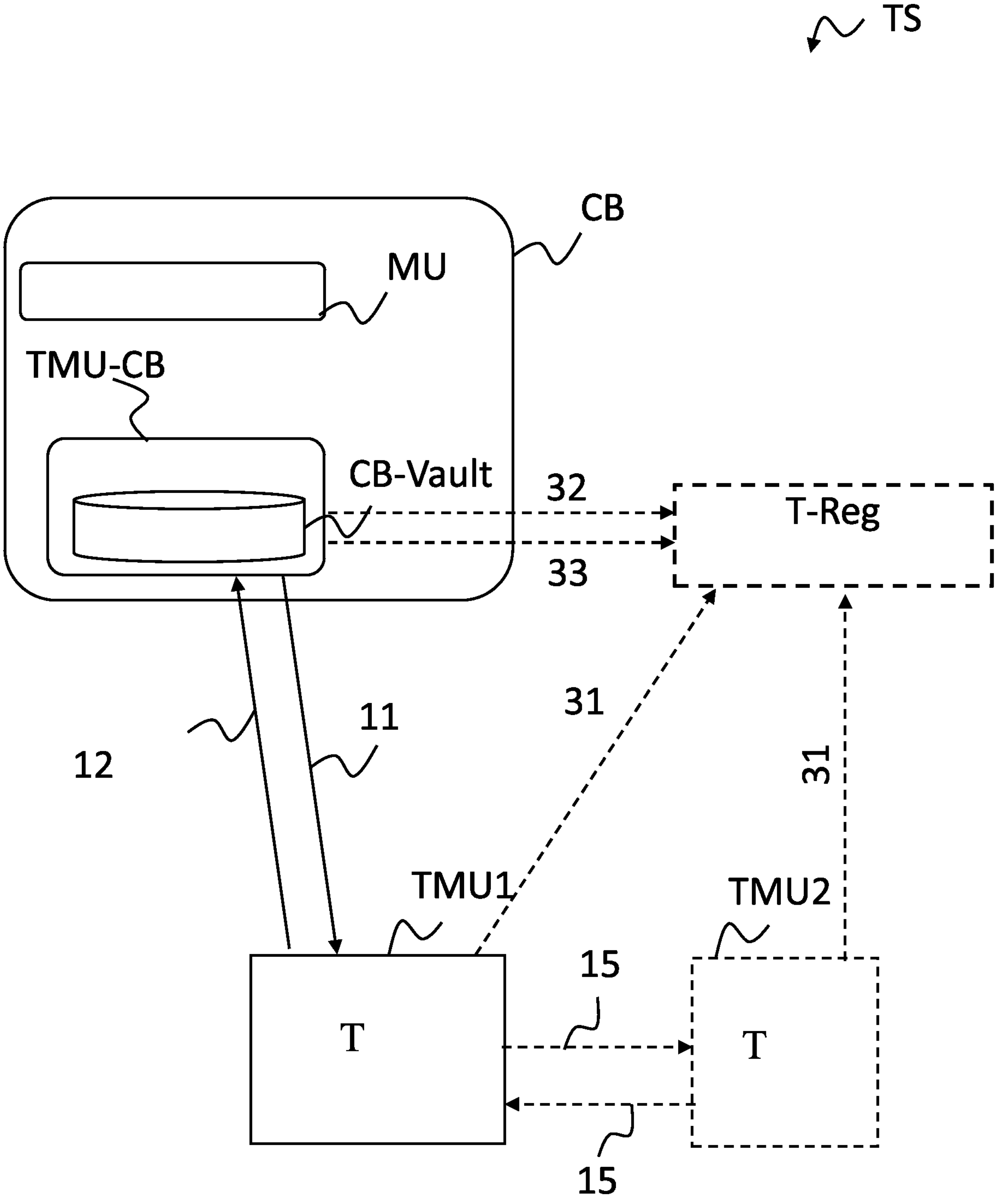
FIG. 1 shows a conventional transaction system for token transactions according to the prior art.

FIG. 1 shows a conventional transaction system for transmitting tokens T according to the prior art, as for instance only described in WO 2022/008 319 A1. For greater details it is referred thereto.

A minting unit MU of the issuing unit CB, e.g., of a central bank, generates new token. These generated tokens are transferred to a CB-vault of an outputting unit e.g., using an air-gap process. The outputting unit may be a secure wallet, such as a secure token management unit of the central bank TMU-CB. The new token to be issued is registered in the token register T-Reg by sending a create request 32.

For example, upon request from a token managing unit TMU1, e.g., a token managing unit (secure wallet) of a service provider unit, such as a financial service provider, e.g., a commercial bank, new tokens T are directly transferred 11 into the TMU1. Typically, TMU1 will generate a token T of the required monetary value (switch, split or merge), send a replacement request 31 to the token register T-Reg and will transfer 15 the token T to a secure wallet TMU2, e.g., a token managing unit (secure wallet) of a costumer of the commercial bank. Typically, TMU2 will perform a switch or a merge for the token T received and optionally send a registration/replacement request 31 to T-Reg. Tokens T that a costumer would like to redeem, may be transferred 15 to TMU1. TMU1 may request a deletion 12 of the old token T at the CB. CB will create a destruction request (in the melting unit), send the destruction request 33 to the token register T-Reg and will delete the token in the CB-Vault. So, payment transactions and receiving new/old tokens are handled by a single secure wallet, hereinafter referred to as TMU meaning token management unit.

Figure 2:
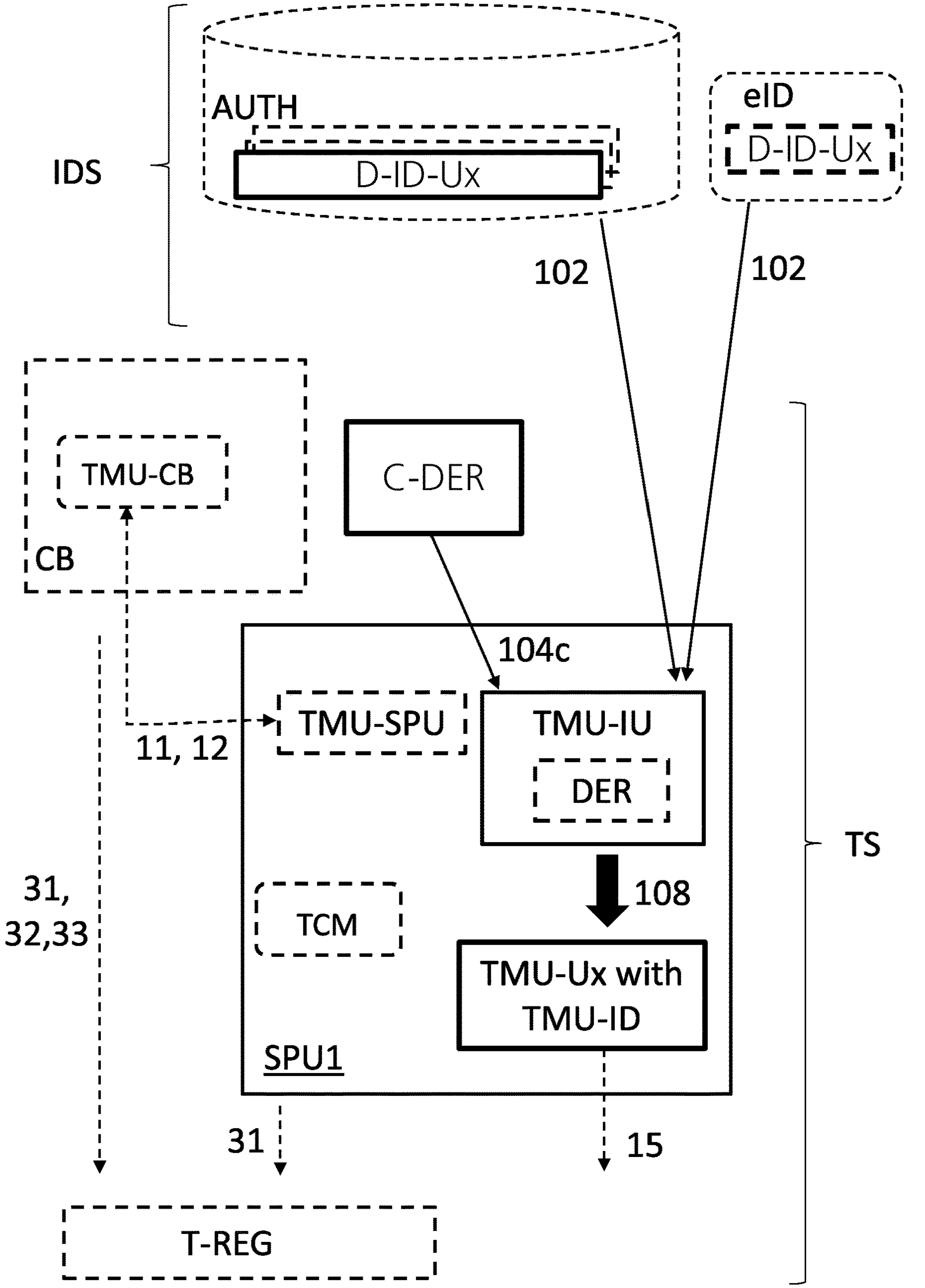
FIG. 2 shows an exemplary embodiment of an electronic payment system of the present invention.

In FIG. 2, an exemplary embodiment of an electronic payment system TS of the present invention is shown. Optional units of TS are typically indicated by dashed lines.

Here an electronic payment system TS is shown having a secure token issuing unit CB for issuing new tokens and deleting old tokens. The CB is a part of a central bank issuing CBDC.

The TS further comprises a service providing unit SPU1. Further service provider units SPU may be included in the TS (not shown in FIG. 2). Preferably, TMU-SPU already comprises multiple tokens T, for example ready to be exchanged 15 with other TMUs, such as user token management units TMU-Ux, with or without prior modification (switch, split, merge). SPU1 can be part of a financial service provider such as a commercial bank. SPU1 may further comprise control means TCM and/or user token management units TMU-Ux provided as a service for the user by SPU1.

The SPU1 may have a secure management token unit TMU-SPU1 (shown in dashed lines). This TMU-SPU1 comprises control means (not explicitly shown in FIG. 2) for managing one or more token of the TS. The control means TCM is configured to cause a direct exchange 15 of one or more tokens T with one or more other secure management units TMU-Ux in the TS. The TMU-Ux are either hosted in the SPU1 (entity of the SPU1, a user logs in remotely via a terminal device, such as computer or smart phone). Alternatively (not shown in FIG. 2), the TMU-Ux are external to the SPU1, e.g., as physical hardware or software entities in the sphere of the individual users. Both, hosted and external TMU-Ux can be issued by the SPU1.

The optional secure token issuer unit CB, in addition to a minting unit (not shown) and a melting unit (not shown) may comprise control means TCM and may comprise a token management unit TMU-CB (not shown in FIG. 2). CB is a unit of the issuer, typically the national/regional central bank.

A TMU-CB (not shown in FIG. 2) is provided for sending new tokens and/or receiving old tokens, see FIG. 1. Preferably TMU-CB already comprises multiple new tokens T ready to be issued by CB to secure wallets of participants of the TS. TMU-CB thus is also provided to store minted tokens prior to issuance/distribution (minting on stock) or to store to-be-deleted old tokens prior to melting (ready to be melted tokens). Generated new tokens T may be transferred 11 and new tokens T are registered in the token register T-Reg by sending a create request 32. Tokens T to be redeemed may be transferred 15 to TMU-SPU. TMU-SPU may request a deletion 12 of old token T at the CB. CB will create a destruction request (in the melting unit), send the destruction request 33 to the token register T-Reg and will delete the token in the CB-Vault.

The optional token register T-Reg registers token references of tokens of TS. T-Reg may receive and process replacement requests 31 including token references from CB and/or SPU1 and/or TMU-Ux. Replacement requests 31 will typically comprise at least one registered token reference and at least one replacement token reference. Replacement requests 31 must be value neutral (no change of sum of monetary values registered). Replacement requests 31 furthermore include a (cryptographic) proof of ownership of the registered token(s). T-Reg will accept creation requests 32 (add token reference of new token) and/or destruction (delete token reference of old token) requests 33 only, if created by CB.

In TS only the token issuer unit CB may issue new tokens into TS or delete old tokens from TS. Only CB may thus change the overall sum of monetary values of tokens in TS.

A control means TCM in the CB (or in an SPU, SPU1) is adapted to control the processing of tokens T of multiple token management units TMU. The CB may comprise a plurality of TMUs of further service provider units SPU. The TCM in CB is provided for multiple service provider token management units.

A transfer of tokens between TMU-1-SP1 and TMU-Ux is for instance described in WO 2020/212 331 A1, DE 10 2021 004548 or DE 10 2021 004 020. The processing details for tokens described therein not only include the receiving and sending of tokens T, but for example also include token modifications (generating, replacement) or token registration, e.g. by registration request 31 provided to a token register T-Reg as well as access to respective token storages, such as SPU1-Vault (which is either located in the CB and/or in the SPU1 and/or elsewhere in the TS) to which the SPU1 has exclusive access.

At least the above aspects (of TS/CB/SPU1/T-Reg) described for FIG. 1 or 2 can be applied to any of the present embodiments. The following aspects discussed for FIG. 2 may as well be generally applied, e.g. in FIGS. 3-6, and thus will also not fully be repeated, even though for some aspects adaptations to the corresponding embodiment are necessary. The following description of FIG. 2 at least partly includes reference signs 101 to 108 of a method illustrated in more detail in FIG. 6.

For issuing a token management unit TMU-U to a user, e.g., upon explicit request 101, the SPU1 receives 102 digital identification data D-ID-Ux of the user at an external entity. Here, the external entity is a central database hosted by an official authority unit AUTH, e.g., a resident's registration office or etc. The AUTH in FIG. 2 is not part of the TS. The digital identification data D-ID-Ux identify the user in an (external) digital identity system IDS. The (external) digital identification data D-ID-Ux may be the identity card number that identifies the identity card of the user. Other digital identification data may be used as described above (passport number in passport system, tax number in tax system . . . ). This D-ID-Ux may alternatively be provided from an electronic identity document or/electronic identity application, eID, of the user instead from the AUTH. Only in addition to the IDS, the D-ID-UX may be additionally stored in the CB and, e.g. after a first wallet issuance for the user, may be provided 102 from the CB instead.

For example in return to a request of the TMU-IU and/or as a part of an authentication process, the D-ID-Ux is received 102, preferably from the AUTH or the electronic identity document or application, eID.

In an embodiment not shown in FIG. 2, a TMU-ID at least partly derived from the D-ID-Ux may be received in the SPU from the AUTH, the CB or the eID. FIG. 2 illustrates an derivation unit DER in the SPU, preferably in the TMU-IU of the SPU, and a central derivation unit C-DER. DER and/or C-DER may derive at least a part of the TMU-ID (or the TMU-ID) from the D-ID-Ux. At least the derived part of the TMU-ID is received 104*c* in the SPU, if it is not internally derived.

The derivation hides the digital identification data D-ID-Ux in the TMU-ID. It may be cryptographically hidden, e.g. by using a cryptographic key of the CB known to the source of the derived part/derived TMU-ID. Another or a further cryptographic key and/or another or further digital signatures may be used, e.g., a cryptographic key and/or digital signature from the official authority unit AUTH. To reveal the D-ID-Ux, a legal authority, such as a police authority or court authority must release a specific order (e.g. a legal motion or a legal order) that allows to inverse-derive (e.g. decrypt) the D-ID-Ux. Inverse-derivation of D-ID-Ux from TMU-ID requires an inverse-derivation secret, such as the cryptographic key of a first entity, preferably the CB, a private key of a (CB) key pair including the (public) key of the entity and the private key and/or a further cryptographic key of a second entity, such as AUTH.

The result of the derivation is at least a part TMU-ID-VAR of token management unit identification data TMU-ID, which is based on at least the digital identification data D-ID-Ux. The TMU-ID is then assigned to the TMU-Ux to be issued 108 to the participant that requested it. TMU-Ux with TMU-ID may be issued as a hosted wallet hosted in SPU1 or in another SPU. Alternatively the wallet TMU-Ux may be issued as an independent wallet, for example a new secure element (card, SIM, NFC token, TEE, Wearable) or by loading the secure wallet into a existing secure element.

With the solution as shown in FIG. 2, an on-boarding of new CBDC users is easy and highly-secure. For citizens having a bank account already, KYC requirements may be already checked. However, citizens not having a bank account can now be easily integrated into the CBDC payment TS.

The aim of a CBDC is also to increase financial inclusion, i.e. processes are needed to systematize the onboarding of new users, especially if the solution is not to be entirely anonymous.

The shown solution in FIG. 2 is to initiate a secure wallet (software and/or hardware) through the D-ID-Ux which can be provided by a national ID card, for example. Other external ID sources are conceivable, for example a registration of the user in a mobile network environment. e.g. a telecom operator, using IMSI or a SIM number etc.

In this case, the wallet ID is at least partly derived from the D-ID-Ux during issuing the secure wallet and is traceable in case of irregularity. So this treats unbanked citizen the same as banked citizens whose wallet ID is created by the bank and is traceable.

The solution is designed in such a way that this traceability is one-way, i.e. the inverse derivation is not possible, but inverse derivation requires the inverse-derivation secret(s).

This solution as shown in FIG. 2 describes that parts (=TMU-ID-VAR) of the wallet ID (=TMU-ID) is derived by the wallet issuer, which is a SPU, such as a financial service provider, or telecommunication entity or an official authority from a known D-ID-Ux, such as IMSI, passport number, tax number, ID card number) in such a way that only the CB can derive the known ID from the wallet ID and that only the CB or the AUTH can recalculate the used D-ID-Ux from that part (=TMU-ID-VAR) of the wallet ID (TMU-ID).

For example, the tax number is encrypted with the CB's public key and the result is used as the part TMU-ID-VAR of the wallet ID (TMU-ID).

This is in so far different from known approaches as there are D-ID (or plain text names) is encrypted for the CB and it is transmitted in each token transaction as an additional data element intended only for the purpose of ID disclosure by the CB. So, such data have not been used as a part of the wallet ID, which is however advantageous, since no additional data elements are required in the data transmission between the TMUs which reduces network efforts. Furthermore, it is now not necessary anymore that each SPU builds up its own register based on KYC data.

In the TS as shown, a PKI may be used in which certificates are used to identify important structures, such as hardware wallets, T-Reg or CB and governing certificate authorities, CA. For certificates, there are two important fields: subject names (=common names) and serial numbers, both are 16 bytes long. The subject, which is the logical name of the entity identified by the certificate, requires a naming scheme for practical purposes. The certificate for the wallet ID typically further comprises a public key of (a public key pair) the wallet, the public key preferably being a public key of a public key pair and/or an public authentication key.

Serial numbers of certificates must be unique relative to their CA. The serial number is a number given by the issuing CA, which is just counted up. The combination of serial number and subject name is globally unique for the certificate within the TS.

Subject name of a wallet, such as a hardware wallet (smart card) and a hosted wallet (within the SPU), may be the wallet ID (TMU-ID).

The TMU-ID may need to fulfil some or all of the following criteria:

The TMU-ID may need to convey if it is a Wallet certificate, or CA certificate or Admin-CA end-entity certificate.

The TMU-ID may need to be small to be transferred and stored in a hardware wallet, e.g. a smart card. The TMU-ID may need to fit into the subject field of a certificate, e.g. a length of 16 bytes should not be exceeded.

The TMU-ID may need to remain stable across changes to certificates.

The TMU-ID may need to contain information about the SPU (FSP) so that SPUs (or their payment processors) can use it to route data to the SPU (or their payment processor). For example the information enables entities to find the IP address of the SPU (or their payment processor).

The TMU-ID should contain an identifier of the CB to allow cross-currency transfers (=multi-currency transactions or multi-currency transaction systems).

The TMU-ID may need to contain an identifier for identifying the TMU within the FSP.

Options for detailed structures of TMU-IDs is provided in FIGS. 4*a* to 5*d* below.

Figure 3:
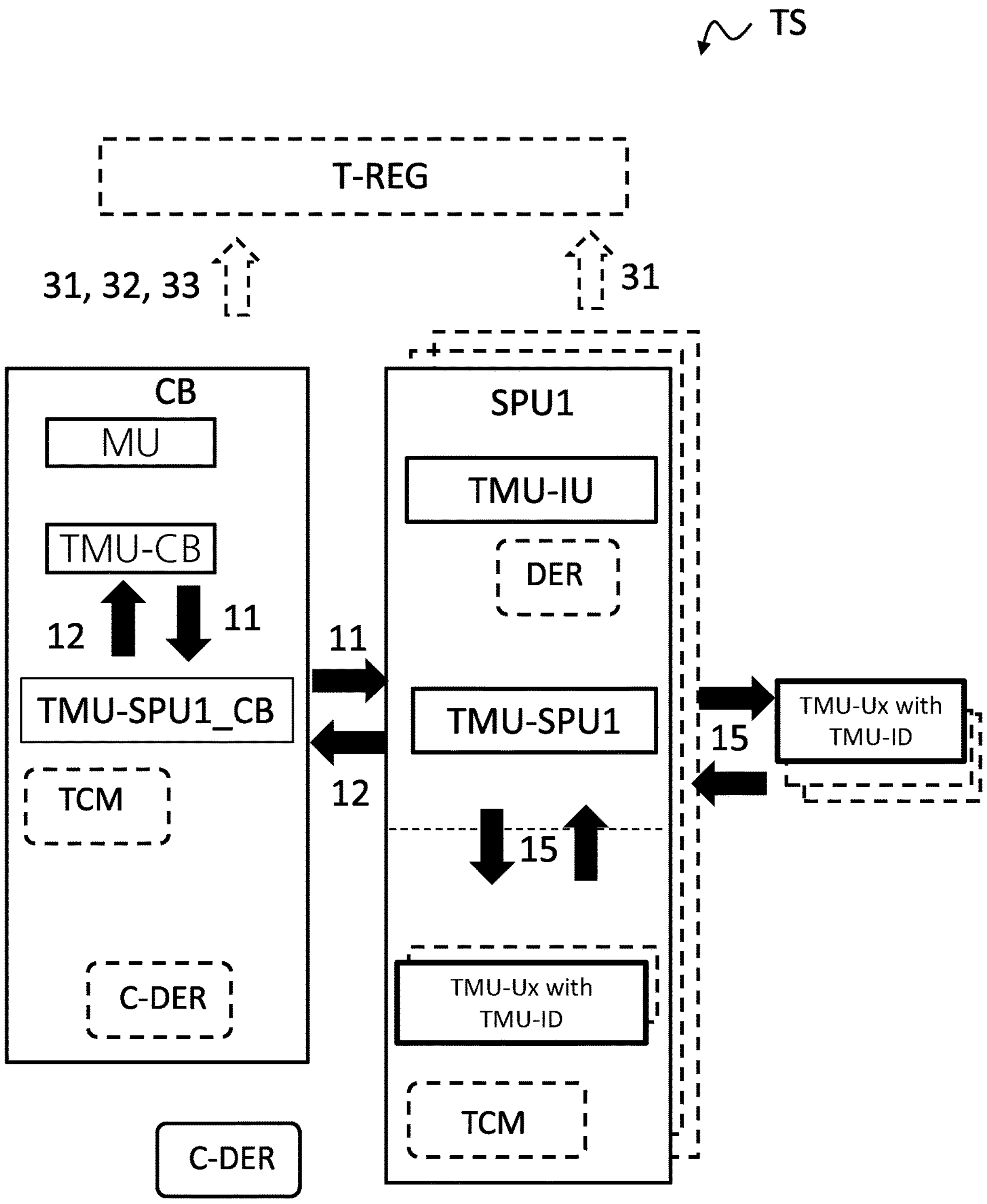
FIG. 3 shows another exemplary embodiment of an electronic payment system of the present invention.

In FIG. 3, another exemplary embodiment of an electronic payment system of the present invention is indicated. Basically the entities in the TS as shown in FIG. 2 (or 1) may also be present in the TS of FIG. 3 although they may not be explicitly drawn or discussed. Each entity may provide functionalities based on dedicated application programming interfaces, API.

TS may comprise a derivation unit DER in the SPU1 (or in each SPUx). Alternatively a central derivation unit C-DER may be provided in CB or as a separate central unit.

Here an electronic payment system TS is shown having a secure token issuing unit CB for issuing new tokens and deleting old tokens. The CB is a part of a central bank. The CB comprises a minting unit MU and has access to a CB-wallet TMU-CB. The wallet of the CB is preferably part of the CB to ensure security requirements. Alternatively, the CB-wallet may be a wallet remote to the CB (not shown in FIG. 3).

The TS further comprises a service providing unit SPU1. Further service provider units SPU are indicated in dashed lines. The SPU1 has a secure management token unit TMU-SPU1. This TMU-SPU1 comprises control means for managing one or more token of the TS. The control means is configured to cause a direct exchange of one or more token with one or more other secure management units TMU-Ux in the TS. The TMU-Ux are either hosted in the SPU1 (entity in the SPU1, a user logs in remotely via a terminal device, such as computer or smart phone). Alternatively, the TMU-Ux are external to the SPU1, e.g., as physical hardware or software entities in the sphere of the individual users. Both, hosted and external TMU-Ux can be issued by the SPU1. The transfer of tokens between TMU-SP1 and TMU-Ux is for instance described in WO 2020/212 331 A1 and includes receiving and sending of tokens, modifications, registration request provided to a token register T-Reg as well as access to respective token storages, to which the SPU1 has exclusive access. The tokens of the wallets in SPU may be stored in a token vault (not shown). E.g. via encryption, each wallet is allowed/enabled to access its own tokens in the token vault only.

In FIG. 3 one or more new token(s) are transferred 11 from TMU-CB to TMU-SPU1_CB, a wallet, preferably one or two wallets, of SPU1 hosted in CB. The new tokens can be transferred 11 from TMU-SPU1_CB to TMU-SPU1. TMU-SPU1 transfers 15 token(s) issued by CB to TMU-Ux. TMU-SPU1 receives 15 (old) token from TMU-Ux. The TMU-SPU1 may store the token and/or later send 12 old tokens to TMU_SPU1-CB for deletion. The old tokens to be deleted will be transferred from TMU_SPU1-CB to TMU-CB.

The TMU-SP1 is thus able to generate and send registration requests 31 including token references to the T-Reg and can access its tokens, which may be stored in the SPU-Vault.

The TMU-SPU1 is also referred to as FSP wallet, assuming that the SPU1 is part of a financial service provider (FSP), such as a commercial bank. The TMU-SPU1 is configured to receive new tokens issued from the CB, e.g. stored in the CB-vault, and/or is configured to send tokens to be deleted (old token) to the CB for being melted in a melting unit (not shown in FIG. 3).

The issuing unit CB itself may comprise/transfer high monetary amounts at once. The token(s) may preferably be stored in a token vault, such as an HSM, and/or transferred by TMU-CB. The TMU-CB only acts internally to the CB. Since the CB unit preferably comprises an internal airgap, between MU and the wallet(s), including TMU-CB, there is a high security process now implemented to avoid attacks.

So, the TMU-SPU1 can be implemented for quick token transfer with TMU-Ux, e.g. for charging the token balance upon request. The TMU-SPU1_CB is furthermore exclusively used for ordering/deleting tokens from/at the CB.

The TMU-SPU1_CB in which the new tokens and the old tokens are handled needs to assure that the new tokens are separately organized from the old tokens. This can be done by different access rules or independent storages or by marking the token as "new" or "old" by using dedicated token elements or listing these tokens in a database exclusively accessible by the TMU-SPU1_CB. An access rule may be that in automated manner, new tokens are directed to the TMU-SPU1 by TMU-SPU1_CB and that old tokens are stored in a storage accessed by the TMU-SPU_CB until the CB/TMU-CB requests these old tokens.

Alternatively and not shown in FIG. 3, the CB may comprise a plurality of TMU-SPUx_CB, each being dedicated for one SPU.

In further contrast to FIG. 2 and FIG. 3, no TMU-CB may be used in the CB. Instead, an outputting unit UO is used to directly forward newly generated tokens and to receive the old tokens. This embodiment is preferred in a scenario, in which the CB should not mint or melt without explicit request from an SPU unit and in such a scenario, no new tokens need to be stored in a TMU-CB. This scenario is also applicable to the other embodiments although not explicitly shown in the Figures.

While using the TMU-SPU1, it is also possible to implement direction restrictions and transaction restrictions. A technical implementation of the direction restrictions and transaction restrictions and other usage restrictions for wallets are described in more detail in DE 10 2021 004 025 and it is referred thereto for further technical details. A technical implementation of conditional transactions can be obtained from DE 10 2021 005 040 and it is referred thereto for further technical details.

FIG. 4*a* to FIG. 4*e* show various exemplary embodiments of secure wallet/token management unit identification data TMU-ID of the present invention.

Figure 4A:
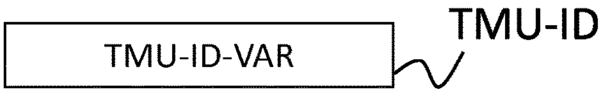
FIG. 4*a*-4*e* show exemplary embodiments of secure token management unit identification data of the present invention.

In FIG. 4*a*, the TMU-ID is entirely built by the TMU-ID-VAR that is obtained/derived as described above. It is referred thereto for further information.

Figure 4B:
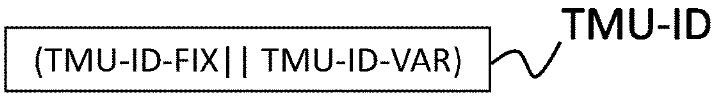

In FIG. 4*b*, the TMU-ID is a combination of the TMU-ID-VAR that is obtained as described above. It is referred thereto for further information. In addition, the TMU-ID comprises a fix part of the TMU-ID. The fix part may have a version value that defines the current version of the TMU-ID format as used. The fix part may alternatively or additionally comprise an CB identifier to enable multi-currency scenarios. The fix part may alternatively or additionally comprise an SPU identifier and/or a smart card producer ID. The TMU-ID may have a length of 16 bytes, whereas the fix part TMU-ID-FIX may have a data length of eight byte and the derived part TMU-ID-VAR may also have eight byte of data length.

The TMU-ID-FIX and the TMU-ID-VAR are combined to form the TMU-ID. This combination preferably is a concatenation, although in some cases it may be a logical combination.

Figure 4C:

In FIG. 4*c*, the TMU-ID is a combination of the TMU-ID-VAR that is obtained as described above. It is referred thereto for further information. In addition, the TMU-ID comprises a fix part TMU-ID-FIX as described with FIG. 4*b*. In addition, the TMU-ID comprises a type-value TMU-ID-TYP. This TMU-ID-TYP may be an information of the type of D-ID-Ux used in the derived part TMU-ID-VAR. This TMU-ID-TYP may be coded according to a coding table to express the type of D-ID-Ux. TMU-ID-TYP preferably indicates the digital identification system, e.g. card ID system, passport system, tax system or driving license system (or even mobile communication system). This TMU-ID-TYP may have a length of 4 bit.

The TMU-ID-FIX, the TMU-ID-VAR and the TMU-ID-TYP are combined to form the TMU-ID. This combination preferably is a concatenation, although in some cases it may be a logical combination.

Figure 4D:

In FIG. 4*d*, the TMU-ID is a combination of the TMU-ID-VAR that is obtained as described above. It is referred thereto for further information. In addition, the TMU-ID comprises a fix part TMU-ID-FIX as described with FIG. 4*b*. In addition, the TMU-ID comprises a type-value TMU-ID-CNT. This TMU-ID-CNT may be an information of the type of D-ID-Ux used in the derived part TMU-ID-VAR. This TMU-ID-CNT may be a counter for a number of wallets issued. It could be a counter for the number of wallets issued by this particular SPU or for this particular user, either in the TS (preferred mode) or the SPU. This TMU-ID-CNT may have a length of 12 bit.

The TMU-ID-FIX, the TMU-ID-VAR and the TMU-ID-CNT are combined to form the TMU-ID. This combination preferably is a concatenation, although in some cases it may be a logical combination.

Figure 4E:
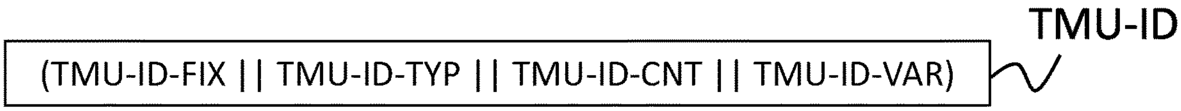

In FIG. 4*e*, the TMU-ID is a combination of the TMU-ID-VAR that is obtained as described above. It is referred thereto for further information. In addition, the TMU-ID comprises a fix part TMU-ID-FIX as described with FIG. 4*b*. In addition, the TMU-ID comprises a type-value TMU-ID-TYP. This TMU-ID-TYP may be an information of the type of D-ID-Ux used in the derived part TMU-ID-VAR. This TMU-ID-TYP may be coded according to a coding table to express the type of D-ID-Ux/the digital identity system. This TMU-ID-TYP may have a length of 4 bit. In addition, the TMU-ID comprises a count-value TMU-ID-CNT. This TMU-ID-CNT may be the actual count of TMU-ID generated by this particular SPU. This TMU-ID-CNT may have a length of 12 bit. Using 4 bits of TMU-ID-TYP, a resulting 4095 different wallets per ID-type can be generated.

The TMU-ID-FIX, the TMU-ID-VAR, the TMU-ID-TYP and the TMU-ID-CNT are combined to form the TMU-ID. This combination preferably is a concatenation.

FIG. 5*a*-5*d* show various exemplary embodiment of derived parts of secure token management unit identification data to be used in the secure token management unit identification data of the present invention.

Each of these Figures shows different input data for the derivation and indicates that a "Secret" may be involved in the derivation. The Secret may be the inverse derivation secret. In these cases derivation and inverse derivation use the same secret. A typical example for these cases would be a symmetric key (of a symmetric cryptographic algorithm). However, the data element "Secret" used in the derivation might also be a public data element, such as a public key of a key pair. Hence, in other cases, the derivation uses: a derivation secret or a public key and/or a public data element and the inverse derivation uses the inverse derivation secret, e.g. the private key of the key pair (of an asymmetric cryptographic algorithm).

Figure 5A:
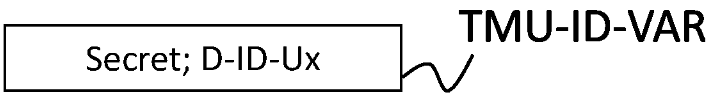
FIG. 5*a*-5*d* show exemplary embodiment of derived parts of secure token management unit identification data to be used in the secure token management unit identification data of the present invention.

In FIG. 5*a*, the TMU-ID-VAR is derived from the D-ID-Ux (only). The D-ID-Ux is cryptographically hidden in TMU-ID-VAR as described above. For the cryptographic securing, a derivation secret-value, such as a private key of a PKI or a random number etc. may be used. So, the D-ID-Ux is encrypted and cannot be revealed without knowledge of the (same or the corresponding) inverse derivation secret.

Figure 5B:
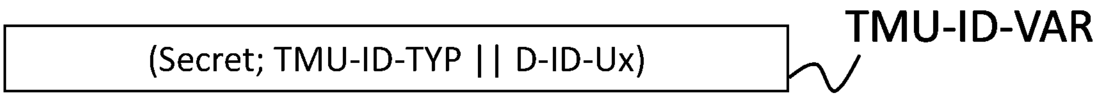

In FIG. 5*b*, the TMU-ID-VAR is derived from a combination of the D-ID-Ux and the type-value TMU-ID-TYP as described in FIG. 4*c* and FIG. 4*e*. This combination preferably is a concatenation. In this Figure and in the following Figures, the derivation may be performed and can be inversed as described above and as described with FIG. 5*a*. In addition the combination preferably is a concatenation respectively.

Figure 5C:
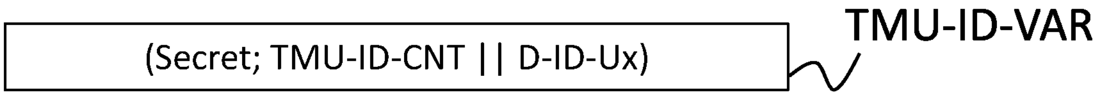

In FIG. 5*c*, the TMU-ID-VAR is derived from a combination of the D-ID-Ux and the count-value TMU-ID-CNT as described in FIG. 4*d* and FIG. 4*e*.

Figure 5D:
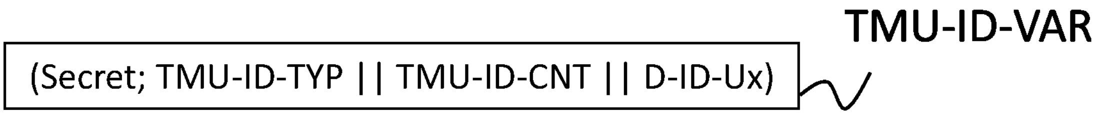

In FIG. 5*d*, the TMU-ID-VAR is derived from a combination of the D-ID-Ux and the count-value TMU-ID-CNT as described in FIG. 4*d* and FIG. 4*e* and the type-value TMU-ID-TYP as described in FIG. 4*c* and FIG. 4*e*.

Any of the derived parts TMU-ID-VAR of FIGS. 5*a* to 5*g* could be used in any of the TMU-ID of FIGS. 4*a* to 4*e*. Thus a further wallet information, such as a wallet type TMU-ID-TYP or a wallet counter TMU-ID-CNT, may be included in a clear text part of the TMU-ID and/or in a derived part of the TMU-ID.

Figure 6:
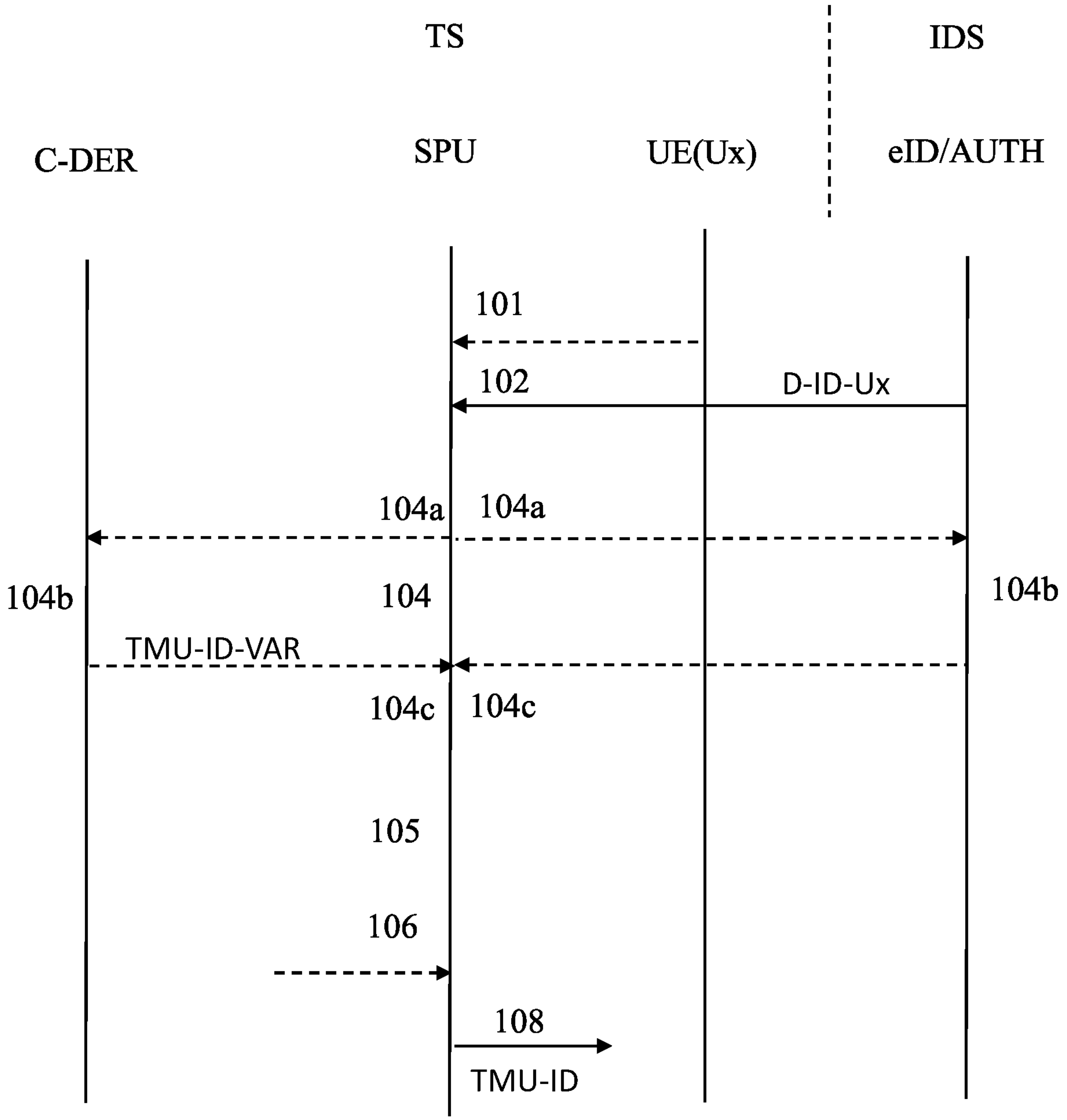
FIG. 6 shows exemplary embodiment of a method of the present invention.

FIG. 6 shows exemplary embodiment of a method of the present invention.

In optional step 101, a user entity UE of user Ux requests a new TMU from a SPU. The UE is an equipment from a costumer (user) Ux of the financial SPU (commercial bank). For example, the user may have a bank account at the SPU. This request 101 is received at the SPU. Each of the steps in FIG. 6 performed in the SPU are preferably performed by the wallet issuing unit TMU-IU of the SPU. The received request may be approved or denied by the SPU. It is assumed here, that the request 101 is approved.

In step 102 external digital identification data D-ID-Ux identifying the user are received by the SPU. Preferably, the D-ID-Ux are received from an digital identity document/application eID of the user or from an digital identity system AUTH. eID and/or AUTH are parts of the external identity system IDS.

FIG. 6 indicates two variants for the derivation, which may be performed as described above. TMU-ID-VAR and/or TMU-ID may be in accordance with any of FIG. 4 and FIG. 5.

In a first variant the SPU derives, in step 104, at least a part TMU-ID-VAR of TMU-ID from D-ID-Ux. Hence, the SPU may include a derivation unit DER. SPU and/or DER preferably are not able to perform the inverse-derivation and/or do not include the inverse derivation secret.

In a second variant the SPU receives, in step 104*c*, at least the derived part TMU-ID-VAR of TMU-ID (or the derived TMU-ID), which has been derived, in previous step 104*b*, by a central derivation unit C-DER, AUTH. In an optional step 104*a* the SPU requests the derived part TMU-ID-VAR or derived TMU-ID from the central derivation unit.

The central derivation unit C-DER may be a separate unit, a subunit of the issuer CB of the TS or a subunit of the identity system IDS. C-DER may be adapted to perform derivation and/or inverse derivation and thus could include the inverse-derivation secret. However, inverse-derivation would of course only be performed, if requested by an authorized entity/process, but not upon request of an SPU.

In step 105, the TMU-ID is assigned to the new TMU-Ux to be issued. In optional step 106 further wallet data, such as a certificate including TMU-ID and optionally including a public authentication key of the wallet, are received and/or generated for the wallet to be issued.

In step 108, the TMU-Ux with TMU-ID is issued by the SPU for the user. The wallet TMU-Ux comprises the TMU-ID and uses the TMU-ID in transactions with other wallets of TS. Transaction protocol data, which are preferably stored in an SPU and/or a central protocol unit of TS, comprise the TMU-ID. The transaction protocol data may comprise the wallet ID TMU-IDs of both wallets involved in the transaction and the transaction.

The wallet TMU-Ux may be a hosted wallet hosted in the SPU. Thus the step 108 of issuing may comprise providing the hosted wallet in the SPU and informing the user. For example, the user entity UE (Ux) may receive TMU-ID and/or wallet access means (such as password and/or a wallet access application).

The wallet TMU-Ux issued may be independent from the SPU. The wallet could be provided in or into a secure element, such as smart card, RFID or NFC token, USB token, SIM, Bluetooth token, TPM of a device, NFC module of a device, TEE of a device or secure wearable. In step 108 for example, the secure element including the wallet may be provided to the user or the wallet may be loaded into the user's secure element, optionally included in the user entity UE.

The SPU is preferably an entity at a financial service provider. The system TS may also comprise a token register T-REG. The token register T-Reg can be reached via an internet connection and/or a mobile communication, using typical protocols such as HTTP, TCP, IP, UDP and or other suitable communication protocols. The transaction system and/or their units may be as described above, in particular in accordance with any of FIGS. 1 to 3.

It is referred to WO 2020/212 337 A1; WO 2020/212 331 A1; WO 2021/170 646 A1 and/or WO 2021/170 645 A1 for more technical details related to the structure of tokens and their corresponding token reference as well as modifications performed or performable at a token, such as SWITCH, SPLIT, MERGE.

In any case, during direct electronic payment transactions between secure elements, in an offline electronic payment transaction, a modification (merge, split, switch) of a token may be recorded as a history date entry in the token. In an online electronic payment transaction, a modification (merge, split, switch) of a token may be registered upon registration request at the T-Reg.

Figure 7:
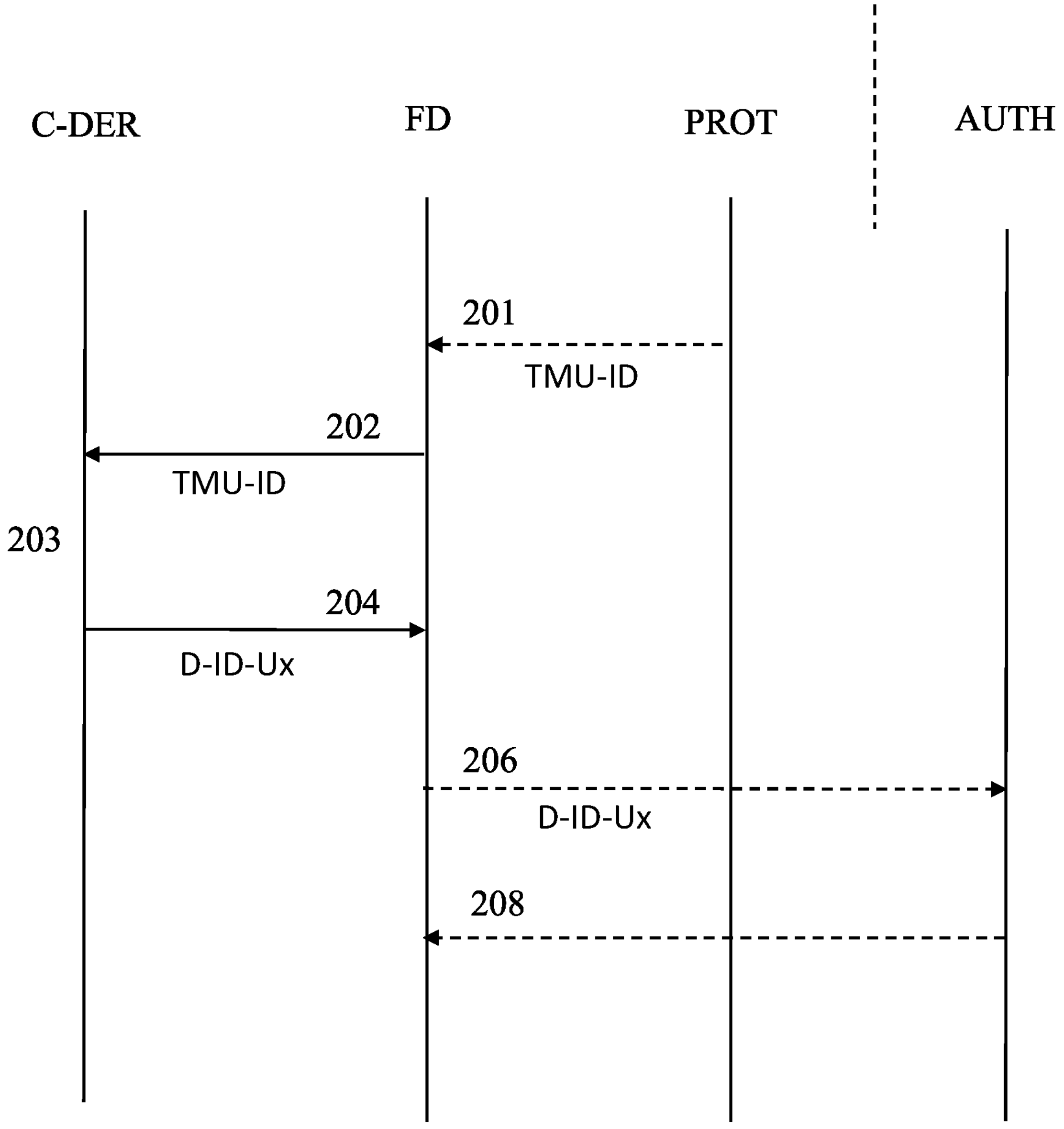
FIG. 7 shows an exemplary embodiment of a method including an inverse-derivation process.

Finally, FIG. 7 shows an example, how inverse-derivation could be performed.

In this example C-DER is assumed to be the entity including the inverse-derivation secret. C-DER could be provided as described above or as a separate unit for inverse-derivation only. FD is a unit of TS which is allowed to request inverse-derivation from C-DER. FD preferably is a fraud detection unit. FD may be a subunit of CB. PROT may be a central transaction protocol data unit of TS. Hence, FD may analyze transaction protocol data and/or detect fraud in TS.

In an optional first step 201 FD receives TMU-ID from PROT, for example within a fraud detection process.

In step 202 FD requests inverse-derivation for TMU-ID (or the derived part TMU-ID-VAR only) from C-DER.

From TMU-ID(-VAR) C-DER in step 203 invers-derives D-ID-Ux—and optionally further input data of the derivation such as a counter and/or a ID type—using the inverse-derivation secret. In step 204 C-DER provides D-ID-Ux and optionally TMU-ID-CNT and/or TMU-ID-TYP, to FD. FD may request 206 and receive 208 user details, such as a user name and address, from the identity system AUTH. Alternatively, user details may be provided by C-DER in step 204.

In preferred embodiments of C-DER of FIG. 2, 3, 6 or 7, C-DER stores and manages a counter TMU-ID-CNT for each user identity (which counts the number of wallets issued for the user in TS). In addition or alternatively C-DER may store user details, particularly in an encrypted form. C-DER could for example store a hash of D-ID-Ux (or TMU-ID) together with the counter and/or the encrypted user details. These data are preferably stored/updated (counter increased or details amended) upon each derivation. Hence, only upon request for inverse-derivation for a given TMU-ID, the user details of the corresponding user would be decrypted. As already indicated above, a second inverse-derivation secret of a second party, such as a court or CB, may be additionally required for inverse-derivation. This second secret could be provided in request 202. In further variants, the decryption of the user details would require a decryption key of the second party, wherein the decryption key could be provided in step 202 or subsequently used after receiving encrypted user details in step 204.

The invention claimed is:

1. A secure service provider unit (SPU) in an electronic transaction system (TS), the secure service provider unit (SPU) comprising:

a secure wallet issuing unit (TMU-IU) comprising one or more processors and a memory storing instructions that, when executed by the one or more processors, cause the secure wallet issuing unit (TMU-IU) to issue secure wallets (TMU-U) for users (U) in the electronic transaction system (TS), wherein each secure wallet (TMU-Ux) comprises wallet identification data (TMU-ID), the wallet identification data (TMU-ID) being assigned to a secure wallet (TMU-Ux) for uniquely identifying the secure wallet (TMU-Ux) in the electronic transaction system (TS), and wherein the wallet identification data (TMU-ID) is used in transactions with other wallets of the electronic transaction system (TS);

wherein the secure wallet issuing unit (TMU-IU) is further configured to receive external digital identification data (D-ID-Ux) from a digital identity document of the user or from an external digital identity system, and to provide at least a part (TMU-ID-VAR) of the wallet identification data (TMU-ID) which is derived from external digital identification data (D-ID-Ux);

wherein the secure service provider (SPU) is configured to derive at least the derived part of the wallet identification data (TMU-ID) or to receive at least the derived part from a central derivation unit (C-DER) of the transaction system (TS); and wherein the external digital identification data (D-ID-Ux) is assigned to the user in an external digital identity system for uniquely identifying the user, and wherein the external digital identification data (D-ID-Ux) is encrypted with a cryptographic key to derive at least the part (TMU-ID-VAR) of the wallet identification data (TMU-ID), wherein secret inverse-derivation data comprises a corresponding cryptographic key required to decrypt the encrypted external digital identification data (D-ID-Ux).

2. The secure service provider unit (SPU) according to claim 1, wherein the secure wallet issuing unit (TMU-IU) is configured to provide the derived part (TMU-ID-VAR) of the wallet identification data (TMU-ID) or the derived wallet identification data (TMU-ID); and/or the wallet identification data (TMU-ID) comprises data fields, wherein one of the data fields is used for inserting the derived part (TMU-ID-VAR) of the wallet identification data (TMU-ID).

3. The secure service provider unit (SPU) according to claim 1, wherein the wallet identification data (TMU-ID) comprises at least one of:

a data field for a type-value configured—to identify an external digital identity system of the external digital identification data (D-ID-Ux); and/or a data field for a count-value, wherein the count-value being configured to identify a number of secure wallets (TMU-Ux) issued, by the secure service provider unit (SPU) or in the electronic transaction system (TS), for the external digital identification data (D-ID-Ux) and/or the user.

4. The secure service provider unit (SPU) according to claim 1, wherein the wallet identification data (TMU-ID) comprises one or more variable data fields, for the derived part and optionally for the type-value and/or the count-value, and one or more predefined data fields.

5. The secure service provider unit (SPU) according to claim 1, wherein the external digital identity system is a national or a government digital identity system and/or wherein the digital identification data (D-ID-Ux) is at least one of the following: a tax number of a tax system, an identity card number of a national or international identity card system, a passport identity number of a national or international identity card system, a driver license number of a national or international driver license system or a mobile subscriber identity of a mobile communication system.

6. The secure service provider unit (SPU) according to claim 1, wherein the wallet identification data (TMU-ID) includes the external digital identification data (D-ID-Ux)—and optionally the type-value and/or the count-value—in a form hidden by the derivation.

7. The secure service provider unit (SPU) according to claim 1, wherein the secure wallet issuing unit (TMU-IU) is configured to issue a hosted secure wallet (TMU-SPU), hosted on the secure service provider unit (SPU) or hosted on another secure service provider unit, or an independent secure wallet (TMU-Ux), by issuing a secure element including the secure wallet or by provisioning the secure wallet into a secure element including a secure execution environment.

8. The secure service provider unit (SPU) according to claim 1, wherein the secure wallet issuing unit (TMU-IU) is further configured to issue one or more secure sub-wallets from the issued secure wallet (TMU-Ux) for that user (U) in the electronic transaction system (TS), wherein the wallet identification data (TMU-ID) of the one or more secure sub-wallets is generated from the wallet identification data (TMU-ID) of the issued secure wallet (TMU-Ux) for that user (U) for uniquely identifying the one or more secure sub-wallet in the electronic transaction system (TS), in particular by adding a sub-wallet indicator and/or increasing or adding a count value in the wallet identification data (TMU-ID) of the issued secure wallet (TMU-Ux).

9. An electronic transaction system (TS) comprising:

a plurality of secure wallets (TMU-Ux) of users for directly exchanging tokens (T); and one or more service provider units (SPUx) in an electronic transaction system (TS), the secure service provider unit (SPU) comprising:

a secure wallet issuing unit (TMU-IU) comprising one or more processors and a memory storing instructions that, when executed by the one or more processors, cause the secure wallet issuing unit (TMU-IU) to issue secure wallets (TMU-U) for users (U) in the electronic transaction system (TS), wherein each secure wallet (TMU-Ux) comprises wallet identification data (TMU-ID), the wallet identification data (TMU-ID) being assigned to a secure wallet (TMU-Ux) for uniquely identifying the secure wallet (TMU-Ux) in the electronic transaction system (TS), wherein the wallet identification data (TMU-ID) is used in transactions with wallets of the electronic transaction system (TS);

wherein the secure wallet issuing unit (TMU-IU) is further configured to receive external digital identification data (D-ID-Ux) from a digital identity document of the user or from an external digital identity system, and to provide at least a part (TMU-ID-VAR) of the wallet identification data (TMU-ID) which is derived from external digital identification data (D-ID-Ux);

wherein the secure service provider (SPU) is configured to derive at least the derived part of the wallet identification data (TMU-ID) or to receive at least the derived part from a central derivation unit (C-DER) of the electronic transaction system (TS); and wherein the external digital identification data (D-ID-Ux) is assigned to the user in an external digital identity system for uniquely identifying the user, and wherein the external digital identification data (D-ID-Ux) is encrypted with a cryptographic key to derive at least the part (TMU-ID-VAR) of the wallet identification data (TMU-ID), wherein secret inverse-derivation data comprises a corresponding cryptographic key required to decrypt the encrypted external digital identification data (D-ID-Ux).

10. A method for issuing one or more secure wallets (TMU-U) for users (U) in an electronic transaction system (TS), the one or more secure wallets (TMU-U) being issued by a secure service provider unit (SPU) of the electronic transaction system (TS), the secure service provider unit (SPU) comprising one or more processors and a memory storing instructions that, when executed by the one or more processors, cause the secure service provider unit (SPU) to perform the method by:

receiving external digital identification data (D-ID-Ux) of a user from a digital identity document of the user or from an external digital identity system, wherein the external digital identification data (D-ID-Ux) is assigned to the user in the external digital identity system for uniquely identifying the user;

providing wallet identification data (TMU-ID) including at least a part (TMU-ID-VAR) of the wallet identification data (TMU-ID) being derived based on at least the digital identification data (D-ID-Ux), wherein the secure service provider (SPU) derives at least the derived part of the wallet identification data (TMU-ID) or receives at least the derived part from a central derivation unit (C-DER) of the transaction system (TS);

wherein the wallet identification data (TMU-ID) is used in transactions with other wallets of the electronic transaction system (TS);

assigning the wallet identification data (TMU-ID) to a wallet (TMU-U) for the user to whom the secure wallet (TMU-U) is to be issued in the electronic transaction system (TS); and issuing the secure wallet (TMU-Ux) to the user (U) in the electronic transaction system (TS);

wherein the external digital identification data (D-ID-Ux) is encrypted with a cryptographic key to derive at least the part (TMU-ID-VAR) of the wallet identification data (TMU-ID), wherein secret inverse-derivation data comprises a corresponding cryptographic key required to decrypt the encrypted external digital identification data (D-ID-Ux)

wherein the method further comprises, prior to the receiving step:

receiving a request for a secure wallet (TMU-U) at the secure service provider unit (SPU).

11. A non-transitory computer readable storage medium for tangibly storing computer program instructions capable of being executed by a processor, the computer program instructions defining the steps of claim 10.

12. The system of claim 9, further comprising:

a secure token issuing unit (CB) comprising:

a minting unit (MU) configured to generate a new token to be issued in the electronic transaction system (TS); and a melting unit configured to delete tokens to be deleted from the electronic transaction system (TS); and one or more token register (T-Reg) for registering the tokens (T) or the token references of the tokens (T) of the electronic transaction system (TS).

13. The secure service provider unit (SPU) according to claim 1, wherein the wallet identification data (TMU-ID) is inserted into a subject name data field of a cryptographical certificate used in a transaction or storage of tokens within the electronic transaction system (TS).

* * * * *